(12) United States Patent
Radun et al.

(10) Patent No.: US 10,199,834 B2
(45) Date of Patent: Feb. 5, 2019

(54) METHOD FOR CONTROLLING THE SUPPLY OF POWER TO A POWER SYSTEM FOR AN AIRCRAFT

(71) Applicant: GE Aviation Systems LLC, Grand Rapids, MI (US)

(72) Inventors: Arthur Vorwerk Radun, Cincinnati, OH (US); Phillip Henry Richard Epps, Pompano Beach, FL (US)

(73) Assignee: GE Aviation Systems LLC, Grand Rapids, MI (US)

( * ) Notice: Subject to any disclaimer, the term of this patent is extended or adjusted under 35 U.S.C. 154(b) by 152 days.

(21) Appl. No.: 14/917,692

(22) PCT Filed: Nov. 12, 2013

(86) PCT No.: PCT/US2013/069551
§ 371 (c)(1),
(2) Date: Mar. 9, 2016

(87) PCT Pub. No.: WO2015/034547
PCT Pub. Date: Mar. 12, 2015

(65) Prior Publication Data
US 2016/0214737 A1    Jul. 28, 2016

(30) Foreign Application Priority Data
Sep. 9, 2013 (WO) ................ PCT/US2013/059551

(51) Int. Cl.
*H02J 5/00* (2016.01)
*B64D 41/00* (2006.01)
(Continued)

(52) U.S. Cl.
CPC ................ *H02J 5/00* (2013.01); *B64D 41/00* (2013.01); *B64D 47/00* (2013.01); *H02J 4/00* (2013.01);
(Continued)

(58) Field of Classification Search
CPC ... B64D 47/00; H02J 4/00; H02J 9/06; H02M 7/04; H02M 7/44
See application file for complete search history.

(56) References Cited

U.S. PATENT DOCUMENTS

| 5,914,542 A | 6/1999 | Weimer et al. |
| 8,513,829 B1 | 8/2013 | Wells et al. |

(Continued)

FOREIGN PATENT DOCUMENTS

| JP | 2009-171759 A | 7/2009 |
| JP | 2012-525815 A | 10/2012 |

(Continued)

OTHER PUBLICATIONS

A PCT Search Report and Written Opinion issued in connection with corresponding PCT Application No. PCT/US2013/058743 dated May 13, 2014.
(Continued)

*Primary Examiner* — Daniel Cavallari
(74) *Attorney, Agent, or Firm* — GE Aviation Systems LLC; William Andes

(57) ABSTRACT

A method for controlling the supply of power to a power system for an aircraft having a plurality of power-consuming components includes supplying power to the power system with a generator having a power output, determining a power requirement of the power system, and supplying the power to the power-consuming components.

11 Claims, 4 Drawing Sheets

(51) Int. Cl.
*H02M 7/02* (2006.01)
*H02M 7/44* (2006.01)
*H02J 7/34* (2006.01)
*H02J 9/06* (2006.01)
*B64D 47/00* (2006.01)
*H02J 4/00* (2006.01)
*H02M 7/04* (2006.01)
*H02J 1/10* (2006.01)
*H02J 1/00* (2006.01)

(52) U.S. Cl.
CPC ............... *H02J 7/345* (2013.01); *H02J 9/06* (2013.01); *H02M 7/02* (2013.01); *H02M 7/04* (2013.01); *H02M 7/44* (2013.01); *B64D 2221/00* (2013.01); *H02J 1/10* (2013.01); *H02J 2001/004* (2013.01); *Y02B 90/14* (2013.01)

(56) References Cited

U.S. PATENT DOCUMENTS

| | | | |
|---|---|---|---|
| 2009/0302153 A1* | 12/2009 | Matasso | B64C 13/50 244/99.2 |
| 2011/0140513 A1 | 6/2011 | Brookfield | |
| 2012/0043822 A1 | 2/2012 | Swenson et al. | |
| 2012/0232728 A1 | 9/2012 | Karimi et al. | |
| 2013/0086919 A1 | 4/2013 | Dooley et al. | |
| 2013/0099560 A1 | 4/2013 | Shipley et al. | |

FOREIGN PATENT DOCUMENTS

| | | |
|---|---|---|
| JP | 2013-513518 A | 4/2013 |
| WO | 2012/111508 A1 | 8/2012 |

OTHER PUBLICATIONS

A PCT Search Report and Written Opinion issued in connection with corresponding PCT Application No. PCT/US2013/069551 dated Jul. 22, 2014.

Machine translation and Notification of Reasons for Refusal issued in connection with related JP Application No. 2016-540863 dated Sep. 26, 2017.

Machine translation and Notification of Reasons for Refusal issued in connection with corresponding JP Application No. 2016-540868 dated Oct. 17, 2017.

* cited by examiner

METHOD FOR CONTROLLING THE SUPPLY OF POWER TO A POWER SYSTEM FOR AN AIRCRAFT

CROSS REFERENCE TO RELATED APPLICATIONS

This application is a national stage application under 35 U.S.C. § 371(c) of prior filed, co-pending PCT application serial number PCT/US2013/069551, filed on Nov. 12, 2013, which claims priority under 35 U.S.C. § 119 to International Application No. PCT/US2013/058743, filed Sep. 9, 2013. The above-listed applications are herein incorporated by reference.

BACKGROUND

Power systems, especially power systems in aircraft, manage the supplying of power from power sources, such as batteries or generators, to electrical loads. In aircraft, gas turbine engines are used for propulsion of the aircraft, and typically provide mechanical power which ultimately powers a number of different accessories such as generators, starter/generators, permanent magnet alternators (PMA), fuel pumps, and hydraulic pumps, e.g., equipment for functions needed on an aircraft other than propulsion. For example, contemporary aircraft need electrical power for avionics, motors, and other electric equipment. A generator coupled with a gas turbine engine will convert the mechanical power of the engine into electrical energy needed to power accessories.

BRIEF DESCRIPTION

A method of controlling the supply of power to a power system for an aircraft having a plurality of power-consuming components, some of which have transient power requirements, resulting in the power system having a transient-state power requirement and a non-transient power requirement. The method includes supplying power to the power system with a generator having a predetermined power output incapable of providing sufficient power for the transient-state power requirement, determining a transient power requirement of the power system, comparing the determined transient power requirement to a predetermined power output, determining the transient power requirement exceeds the predetermined power output, and supplying additional power to the power system from a non-battery power source in response to the determination that the transient power requirement exceeds the predetermined power output.

DETAILED DESCRIPTION

The described embodiments of the present innovation are directed to an electrical power system for an aircraft, which enables production of electrical power from a turbine engine, more particularly a gas turbine engine.

Figure 1:
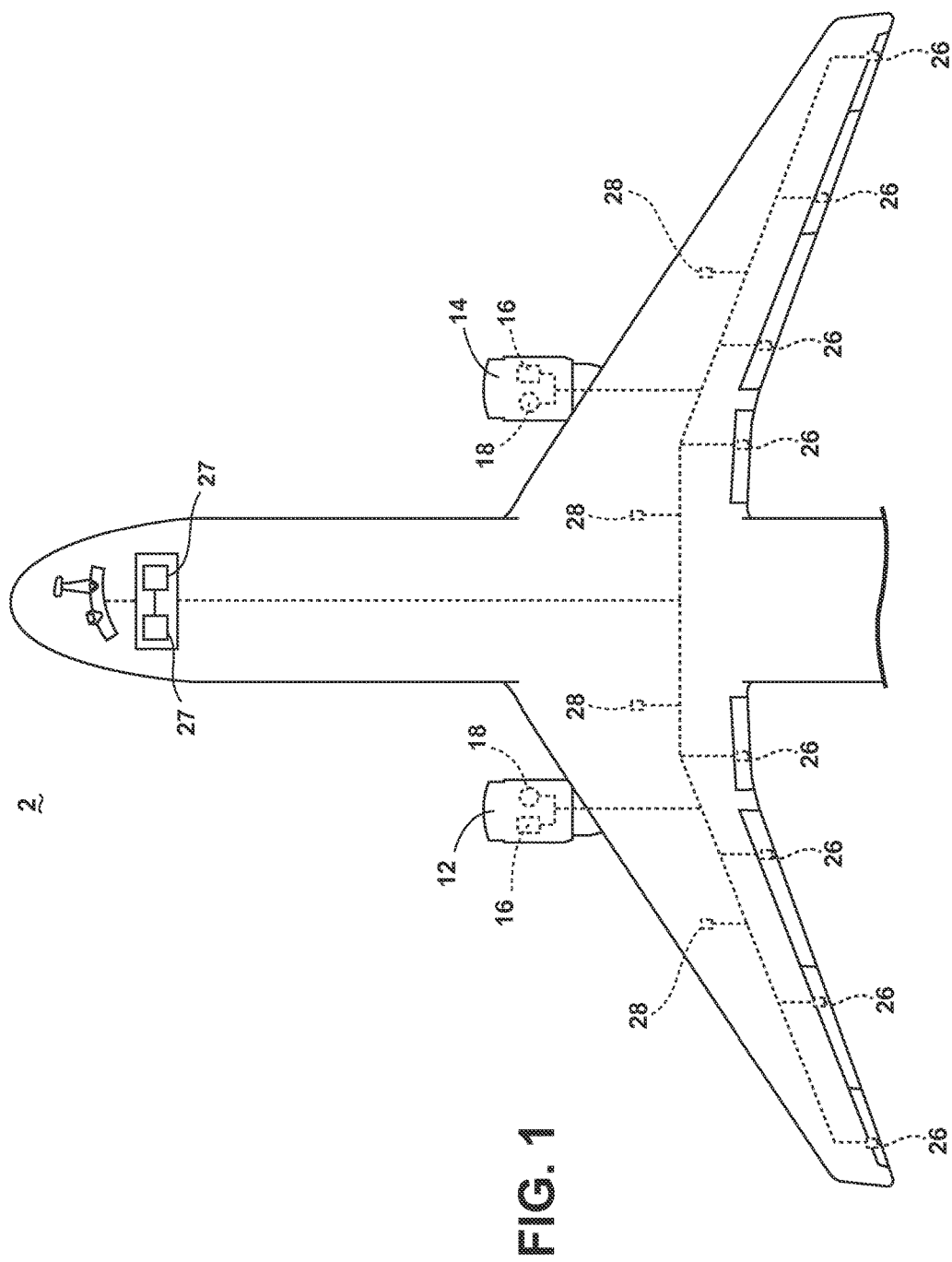
FIG. 1 is a top down schematic view of the aircraft and power system in accordance with various aspects described herein.

As shown in FIG. 1, an aircraft 2 is shown having at least one gas turbine engine, shown as a left engine system 12 and a right engine system 14. Alternatively, the power system may have fewer or additional engine systems. The left and right engine systems 12, 14 may be substantially identical, and are shown further comprising power sources, such as a dual hybrid energy system (DHES) 16 and at least one electric machine, such as a generator 18. The aircraft is shown further comprising a plurality of power-consuming components, for instance, an actuator load 26, flight critical loads 27, and non-flight critical loads 28. Each of the electrical loads 26, 27, 28 are electrically coupled with at least one of the power sources 16, 18 such that the loads 26, 27, 28 are powered by the sources 16, 18.

In the aircraft 2, the operating left and right engine systems 12, 14 provides mechanical energy which may be extracted via a spool, to provide driving force for the generator 18. The generator 18, in addition to the DHES 16, in turn, provides the generated power to the electrical loads 26, 27, 28 for load operations. It will be understood that while one embodiment of the innovation is shown in an aircraft environment, the innovation is not so limited and has general application to electrical power systems in non-aircraft applications, such as other mobile applications and non-mobile industrial, commercial, and residential applications.

Figure 2:
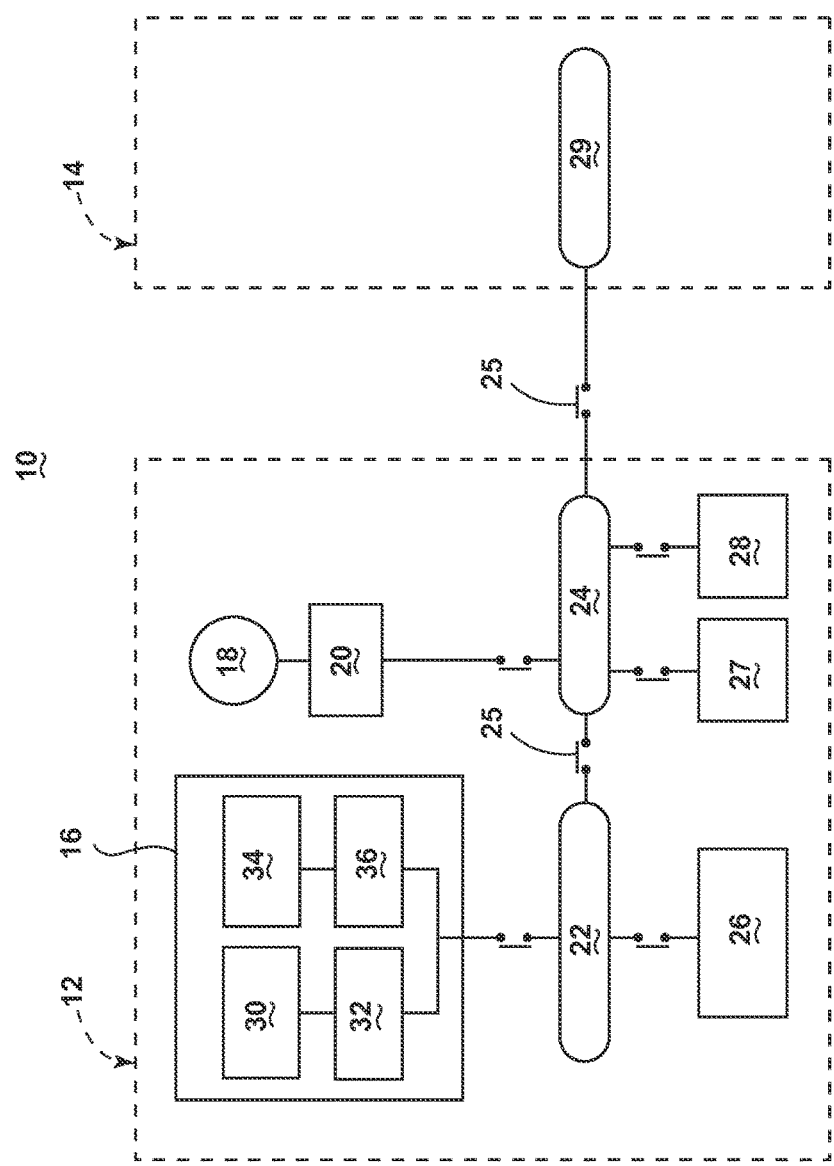
FIG. 2 is a schematic view of the power system in accordance with various aspects described herein.

FIG. 2 illustrates a schematic block diagram of a power system 10 for an aircraft having multiple engine systems, shown including the left engine system 12 and the right engine system 14. The left and right engine systems 12, 14 may be substantially identical; therefore, only the left engine system 12 will be described in detail for the sake of brevity, with the understanding the description applies to all the engine systems.

The left engine system 12 comprises the DHES 16, at least one generator 18, an integrated converter/controller (ICC) 20, at least one power distribution buss, shown including a first DC power buss 22 and a second DC power buss 24, and the actuator load 26, flight critical loads 27, and non-flight critical loads 28. The right engine system 14 is shown only comprising a DC power buss 29, but may duplicate many of the same components of the right engine system 12. The first DC power buss 22 is selectively coupled with the DHES 16, the actuator load 26, and selectively coupled with the second DC power buss 24 via a selectively coupling link 25. The second DC power buss 24 is further selectively coupled with the generator 18, via the ICC 20, the flight critical loads 27, the non-flight critical loads 28, and selectively coupled with a corresponding DC power buss 29 of the right engine system 14 via a selectively coupling link 25.

At least a portion of the electrical loads 26, 27, 28 may have steady state or average power requirements, and at least a portion of the loads 26, 27, 28 may have transient power requirements due to transient operations, such as pulsing loads or RADAR. In this sense, the transient power requirements are greater than the steady-state or average power requirements. The selectively coupling link 25 may be any physical or electrical connection or disconnection device that allows or disallows electrical coupling between two components based on, for instance, predetermined characteristics. In this example, the selectively coupling link 25 may measure for a threshold voltage on the first DC power buss 22. If the measured voltage at the first DC power buss 22 falls below the threshold voltage, the selectively coupling link 25 may couple with the second DC power buss 24 to allow for sharing voltages between the busses 22, 24.

The DHES 16 further comprises a non-battery power source, shown as an ultra-capacitor 30, sequentially coupled with a power controller, such as a first DC to DC converter 32, and a battery power source, shown as a lithium ion (Li-Ion) battery 34, sequentially coupled with a second power controller, such as a DC to DC converter 36. The first and second DC to DC converters 32, 36 provide a common power output which is the output of the DHES 16 selectively coupled with the first DC power buss 22. One example of the first and/or second DC to DC converter 32, 36 may comprise a silicon carbide (SiC) or Gallium Nitride (GaN) based, high bandwidth DC to DC converter. SiC or GaN may be selected based on their solid state material construction, their ability to handle large power levels in smaller and lighter form factors, and their high speed switching ability to perform electrical operations very quickly. Though SiC or GaN based DC to DC converters 32, 36 result in smaller and lighter form factors, Si-based DC to DC converters may be in cost sensitive applications.

The ultra-capacitor 30 may be configured to supply large amounts of DC power over a very short time before completely discharging, on the order of hundredths of a second. As an example, an easily realized 270 volt, 30 farad ultra-capacitor bank, can supply 200 kilowatts for greater than 1.0 s. Additionally, the ultra-capacitor 30 may be recharged and discharged over many cycles without degradation of charge/discharge performance. The battery 34, conversely, may be configured to supply DC power for a longer period time than the ultra-capacitor 30, and may be recharged and discharged over many cycles, but the battery 34 may experience charge/discharge performance degradation over the many cycles, or over time. As an example, a 270V battery made using available 5 ampere-hour cells can supply 50 kilowatt for about 1.6 minutes Alternative non-battery and battery power sources are envisioned. For instance, an alternate non-battery power source may comprise a fuel cell, or an emergency non-battery power source. Additionally, the battery source may comprise the main aircraft battery, or an emergency aircraft battery. Furthermore, each of the non-battery and battery power sources may comprise more than one source, such as a bank of capacitors or a bank of batteries, or any combination of non-battery and battery power sources.

The generator 18 is configured to generate a power supply, for example, an AC power output, from the mechanical energy supplied by an operating gas turbine engine. The AC power output is supplied to the ICC 20, which acts as a rectifier to rectify the AC power output to a DC power output, which is further supplied to the second DC power buss 24. While a generator 18 is shown, it is envisioned the generator 18 may alternatively be a starter/generator, which also provides a starting function for the left engine system 12. In this embodiment, the DHES may supply power capable of starting the left engine system 12 via the starter/generator. In the above example of the power system 10, any AC power outputs are rectified to a DC power output, because the electrical loads 26, 27, 28 operate on DC power.

Additionally, both the ultra-capacitor 30 and the battery 34 are configured to supply DC power to each of their respective first and second DC to DC converters 32, 36. Each DC to DC converter 32, 36 is configured to receive a DC power input, which may be variable, and convert it to a known or predetermined DC power output. For example, the battery 34 may provide 28 VDC, which may then be converted by the second DC to DC converter 36 to a predetermined 270 VDC. Likewise, the ultra-capacitor may provide 340 VDC, which may then be converted by the first DC to DC converter 32 to 270 VDC. Alternative configurations are envisioned wherein the ultra-capacitor 30 and the battery 34 each supply DC power with the same characteristics and only a single DC to DC converter 32 is necessary to convert the same DC power input to a predetermined DC power output. Additionally, alternate DC power outputs from the ultra-capacitor 30 and battery 34, as well as alternative DC power outputs from the first and second DC to DC converters 32, 36 are envisioned, so long as the first and second DC to DC converters 32, 36 supply common DC power outputs.

The predetermined common DC power output of the first and second DC to DC converters 32, 36, and thus, the DC power output from the DHES 16, is supplied to the first DC power buss 22. The power system 10 is thus configured such that the power supplied by the DHES 16 and the power supplied by the generator 18, via the ICC 20, is the same, such as 270 VDC. In this sense, each of the first and second DC power busses 22, 24 receive a similar DC power supply, and operate with the same electrical characteristics.

Each of the first and second DC to DC converters 32, 36 also work in reverse operation as well. For instance, if either of the ultra-capacitor 30 and/or battery 34 has been discharged, the first DC power buss 22 may selectively supply DC power to the respective DC to DC converter 32, 36, which will convert the supplied DC power to a DC power output capable of recharging the respective ultra-capacitor 30 and/or battery 34.

The first and second DC power busses 22, 24 may also be configured to selectively couple with each other, via a selectively coupling link 25, or selectively couple with the DC power busses 29 of the right engine system 14, via a selectively coupling link 25, to share a common DC power supply to power system electrical loads 26, 27, 28 (or any loads of the right engine system 14), during times where the respective power sources 16, 18 cannot provide sufficient power outputs to power all of the loads 26, 27, 28 simultaneously. Additionally, one or more of the first and second DC power busses 22 may be configured to cut or stop supplying the DC power output to non-flight critical loads 28, in the event that insufficient power is supplied from the DHES 16 and generator 18 to power all of the electrical loads 26, 27, 28 simultaneously.

Each of the first and second DC power busses 22, 24 may be further configured to convert the DC power input to a different DC power output, as required by the electrical loads 26, 27, 28. For example, several non-flight critical loads 28 may operate using 28 VDC. In this example, the second DC power buss 24 may be configured to convert the 270 VDC power input to 28 VDC before selectively supplying it to the non-flight critical loads 28.

Figure 3:
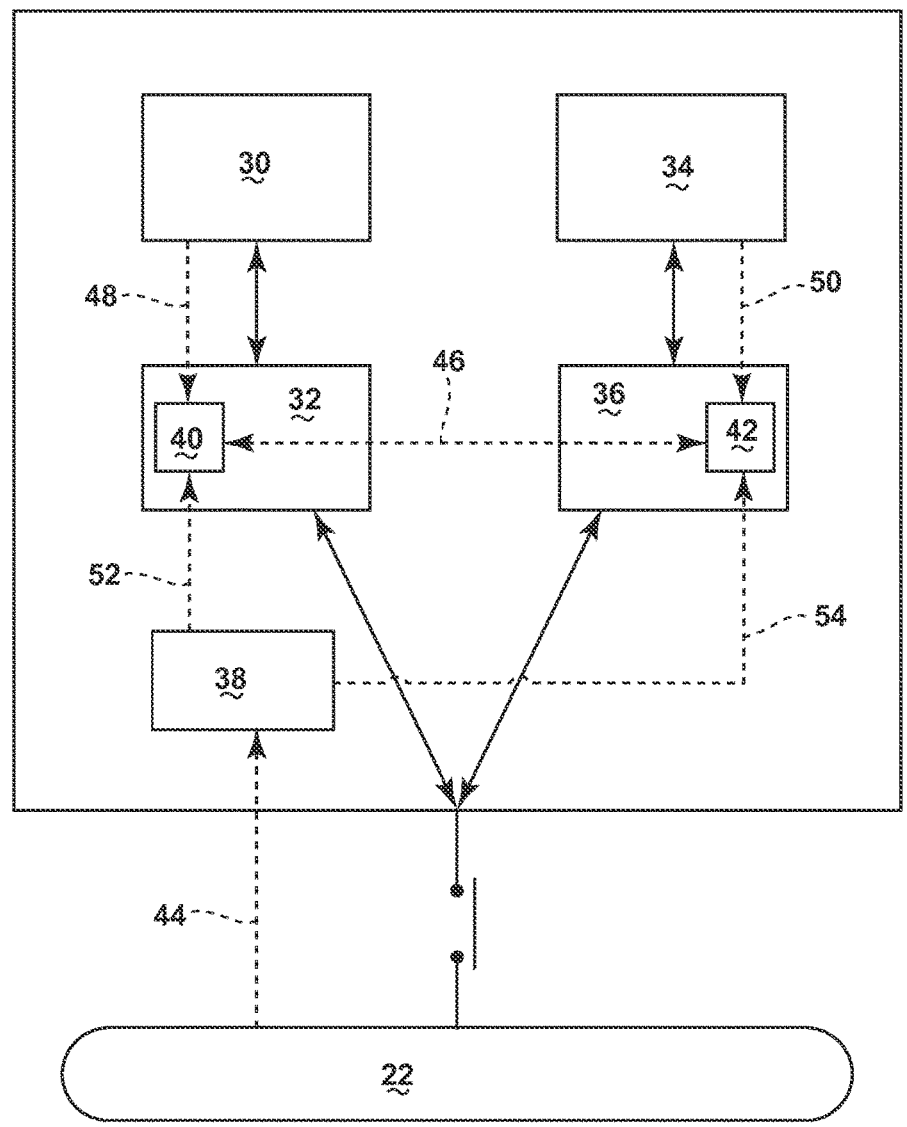
FIG. 3 is a schematic view of the dual hybrid energy system of the power system, in accordance with various aspects described herein.

FIG. 3 illustrates a more detailed schematic view of the DHES 16. As shown, the DHES 16 further comprises a load spectrum selection filter 38, and each of the first and second DC to DC converters 32, 36 further comprises a respective first and second controller 40, 42. The DHES 16 allows for data communications, represented as dotted lines, such that the first controller 40 sends and receives a command signal 46 to and from the second controller 42, receives an ultra-capacitor status signal 48, representative of the current status of the ultra-capacitor 30, for instance as the amount of energy in the ultra-capacitor 30, from the ultra-capacitor 30, and receives a first filter signal 52 from the load spectrum selection filter 38. The DHES 16 further allows for data communications such that the second controller 42 receives a battery status signal 50, representative of the current status of the battery 34, for instance as the amount of energy in the battery 34, from the battery 34, and a second filter signal 54 from the load spectrum selection filter 38.

The load spectrum selection filter 38 is additionally shown receiving a DC power buss signal 44 from the first DC power buss 22, representative of the instantaneous and collective DC power busses 22, 24 energy requirements. Alternatively, the load spectrum selection filter 38 may further receive signals from each DC power buss 22, 24 with each signal being representative of each DC power buss 22, 24 energy requirements to supply the electrical loads 26, 27, 28. In this example, the load spectrum selection filter 38 may summate the energy requirements of all the DC power busses 22, 24 providing signals. Whereas the dotted lines represent data communications, the solid lines of FIG. 3 represent power couplings such that each of the ultra-capacitor 30 and battery 34 allow for bi-directional power transmission to and from each respective first and second DC to DC converter 32, 36, and each converter 32, 36 allows for selective bi-directional power transmission to and from the first DC power buss 22.

The power system 10 operates to supply the average and transient power requirements to the electrical loads 26, 27, 28. In one embodiment of the innovation, the generator 18 is designed, sized, and configured to provide a power output sufficient to supply the average power requirements of the power system 10, but it may not be designed, sized, and configured to provide a power output sufficient to supply the transient power requirements of the system 10. Stated another way, the generator 18 power output may be insufficient to power the transient power requirements of the power system 10.

During the transient power requirements, additional power is supplied to at least one of the first or second DC power busses 22, 24 by the DHES 16 to account for the transient power requirements. The combination of power supplied by the generator 18 and the DHES 16 is sufficient to account for the transient power requirements with the split determined to maximize the system performance such as minimizing its weight, maximizing its life etc. This occurs when at least one of the first and/or second DC power busses 22, 24 senses a transient power requirement occurring (i.e. the busses 22, 24 senses insufficient power is being supplied to the electrical loads 26, 27, 28). At this time, the first and/or second DC power busses 22, 24 sends the DC power buss signal 44, representing that the buss 22, 24 has an insufficient, or close to insufficient amount of power supply to power the electrical loads 26, 27, 28.

The DHES 16 operates to selectively supply power to the first DC power buss 22 in response to the DC power buss signal 44. This occurs when the load spectrum selection filter 38 first receives the DC power buss signal 44 representing the instantaneous energy requirements of the DC power busses 22, 24. The load spectrum selection filter 38 operates, for example, as a low pass filter to operatively remove the slowly varying energy requirements of the DC power buss signal 44. Stated another way, the load spectrum selection filter 38 removes the average power requirements from the energy requirements of the DC power busses 22, 24, leaving only the transient power requirements of the electrical loads 26, 27, 28. The transient power requirements of the DC power busses 22, 24 are provided from the filter 38 to each of the first and second controllers 40, 42 as the first and second filter signals 52, 54. Alternatively, the load spectrum selection filter 38 may operate such that only transient power requirements over a predetermined or dynamic threshold will be provided as the first and second filter signals 52, 54.

The first and second controllers 40, 42 are in bi-directional communication with each other such that they may cooperatively control each respective first and second DC to DC converter 32, 36 to provide a sufficient DC power output from the DHES 16 to account for the increased transient power requirements. In one example, the load is pulsing from no load to 240 kW. The average load power is approximately 100 kilowatts, which is supplied by the generator. When the load pulse occurs the first and second filter signals 52, 54 are provided to each respective first and second controllers 40, 42, indicating that the first DC power buss 22 needs to provide an additional 140 kilowatts of power due to transient power requirements above the average value. The first controller 40 may receive the ultra-capacitor status signal 48, indicating that the ultra-capacitor 30 may provide 120 kilowatts of power by discharging. The second controller 42 may receive the battery status signal 50 indicating the battery 34 may provide 20 kilowatts of power by discharging.

The bi-directional communication between the first and second controllers 40, 42 determines how much additional power each of the ultra-capacitor 30 and battery 34 will provide to account for the transient power requirements. In this example, the first controller 40 may determine the ultra-capacitor 30 will discharge the full 120 kilowatts, and may instruct the second controller 42 to discharge 20 kilowatts from the battery 34. In another example, each of the ultra-capacitor 30 and battery 34 may discharge 70 kilowatts, or the battery 34 may discharge 120 kilowatts while the ultra-capacitor discharges 20 kilowatts. These instances are non-limiting examples of DHES 16 operation.

The DHES 16 may operate such that the first controller 40 discharges the ultra-capacitor 30 whenever possible to account for as much of the transient power requirements as possible. In another instance, if 400 Watts of transient power requirements are needed, and the ultra-capacitor is capable of discharging 800 Watts, the first controller 40 will discharge the ultra-capacitor 30, and the battery 34 will not be discharged at all. Similarly, in another instance, if 800 Watts of transient power requirements are needed, and the ultra-capacitor may discharge 800 Watts, the first controller 40 will discharge the ultra-capacitor 30, and the battery 34 will not be discharged at all. In this example, only in instances where the discharging of the ultra-capacitor 30 will be insufficient to account for the transient power requirements will the battery 34 be discharged. Stated another way, the power system 10 may selectively couple the ultra-capacitor 30 to at least one of the first or second DC power busses 22, 24 prior to selective coupling of the battery 34 to the busses 22, 24. This priority of providing power during transient power requirements allows the power system 10 to repeatedly provide additional sufficient power for the aircraft while actively preventing degradation of charge/discharge performance of the battery 34, by only discharging the battery 34 when necessary to supplement the ultra-capacitor 30 discharge.

With a steady or average load, the first and/or second DC power busses 22, 24 send the DC power buss signal 44 to the load spectrum selection filter 38. The filter 38 thus generates the first and second filter signals 52, 54 indicative that power system 10 is operating with an average power requirement. Each controller 40, 42 also receives the respective ultra-capacitor status signal 48 and battery status signal 50. In the event either the ultra-capacitor status signal 48 or battery status signal 50 indicates the respective power source is not fully charged, the respective first or second controller 40, 42 selectively operates the respective first or second DC to DC converter 32, 36 to allow for the first DC power buss 22 to provide a DC power output which is converted to the proper DC voltage, to charge the respective source 30, 34. Once the ultra-capacitor 30 and/or battery 34 is fully charged, the DHES 16 awaits a transient power requirement.

Figure 4:
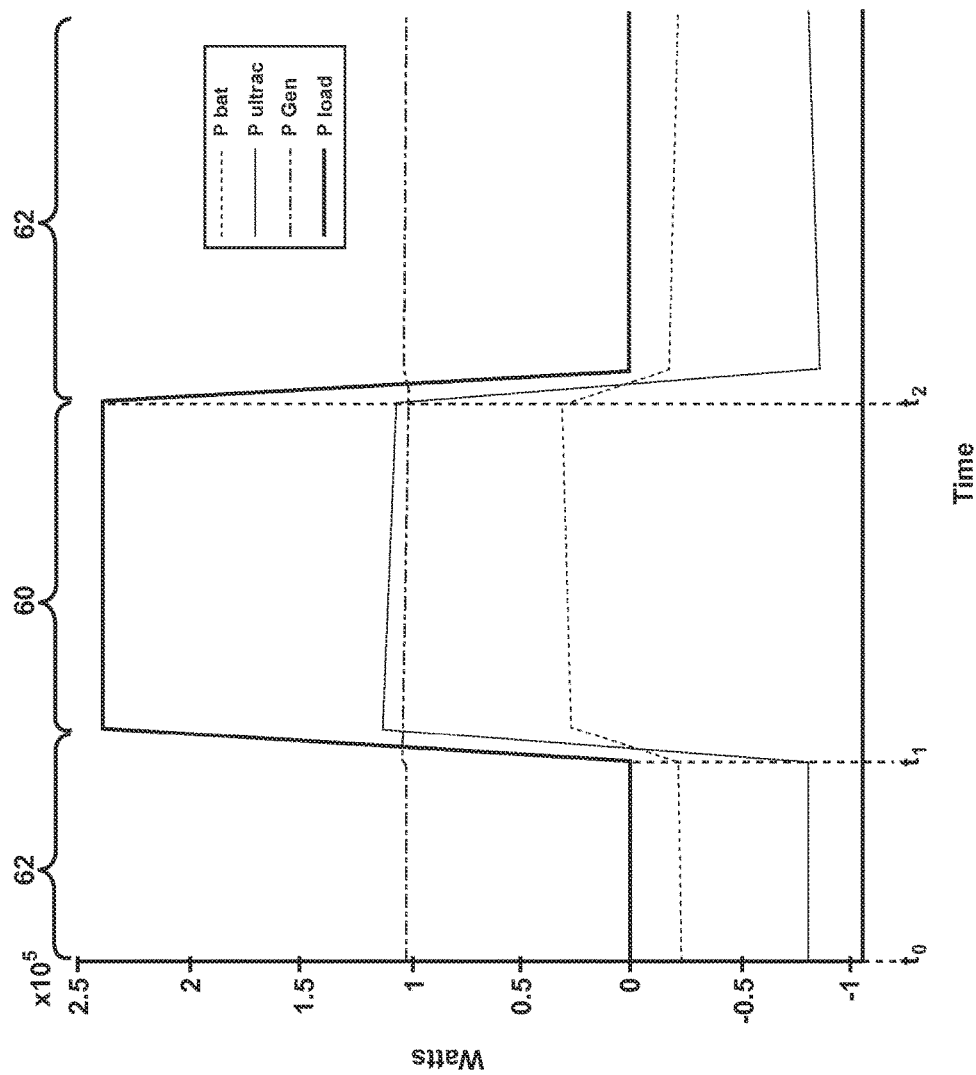
FIG. 4 is a graph showing a transient power response of the power system, in accordance with various aspects described herein.

FIG. 4 illustrates the power requirements of the power system 10 during a transient power requirement 60 followed by a steady-state power requirement 62. In this graph, "P bat" represents the power discharge of the battery 34, "P ultrac" represents the power discharge of the ultra-capacitor 30, "P DHES" represents the power discharge of the DHES 16, and "P load" represents the power requirements of the transient electrical load or loads. As shown, at time $t_0$, no transient power requirements 62 exist. At time $t_1$, a positive power transient occurs, and the DHES 16 begins supplying supplemental power to account for the transient power requirement 60. As shown, the majority of the supplemental power supplied comes from the ultra-capacitor 30 discharge in this embodiment of the innovation. In between times $t_1$ and $t_2$, while the transient power requirement 60 remains constant, the ultra-capacitor 30 discharges such that it supplies a large amount of supplemental power. During this same period, the battery 34 is shown supplying a small fraction of the power supplied by the ultra-capacitor 30 to reduce battery stress and maximize battery life.

At time $t_2$, the load undergoes a new transient when it decreases to zero load, and thus, the power system is operating with an average power requirement 62. During this time, the DC power busses 22, 24 supply power to recharge the ultra-capacitor 30 and battery 34, shown having a negative power value due to recharging, as the DHES 16 tries to keep the load on the generator equal to the value just prior to the $t_2$ load reduction transient. The graph in FIG. 4 illustrates one example of the power system 10 operations, and other operations are envisioned. In a typical generator 18, even an oversized generator capable of providing sufficient power to account for the transient power requirement, the generator 18 may not be able to respond fast enough to the transient power requirement, which may occur, for instance, for only several hundredths of a second.

Many other possible embodiments and configurations in addition to that shown in the above figures are contemplated by the present disclosure. For example, one embodiment of the innovation contemplates more than one generator 18 per engine system 12, 14. In another embodiment of the innovation, the power system 10 may incorporate an emergency power system, wherein the DHES may provide emergency power during emergency operation. In yet another embodiment of the innovation, the second filter signal 54 may be eliminated, and the first controller 40 may receive the first filter signal 52, and then instruct the second controller 42 how to operate based on the amount of power the ultra-capacitor may supply. In yet another embodiment of the innovation, the first and second controllers 40, 42 may be replaced by a single controller which controls all aspects controlled by both controllers 40, 42, and may additionally be located in an alternative location than disclosed, for example, as part of the filter 38, or DC power busses 22, 24. Additionally, any of the aforementioned signals 44, 48, 50, 52, 54 may be, for instance, based on commonly used signal polling systems, or on a commonly used signal trigger systems. Additionally, the design and placement of the various components may be rearranged such that a number of different in-line configurations could be realized.

In yet another embodiment of the innovation, it is envisioned that the DC power busses 22, 24 may alternatively be configured as one or more AC power busses, and the electrical loads 26, 27, 28 operate on AC power. In this embodiment, each of the ultra-capacitor 30, battery 34, and generator 18 will be configured with proper converters and/or inverters to be able to provide AC power at a proper voltage and frequencies to the AC power busses. Additionally, the converters and/or inverters selectively coupling ultra-capacitor 30 and battery 34 the to the AC power busses may be configured to allow for reverse conversion, so that each of the ultra-capacitor 30 and battery 34 may be charged.

The embodiments disclosed herein provide a power system for an aircraft configured to supply additional power to account for transient power requirements. When designing aircraft components, important factors to address are size, weight, and reliability. One advantage that may be realized in the above embodiments is that the above described embodiments have superior weight and size advantages over the conventional type power systems. To provide a generator (alone) to account for the transient power requirements, the generator would need to be larger, resulting in increased size and weight. This increased size and weight may not be desirable for the transient power modes, which may occur infrequently. By allowing for a DHES to provide for supplemental power during transient power requirements, the configuration may allow for a smaller and/or lighter generator which only has to supply average power requirements, rather than scale up to a larger and heavier generator to account for stresses on the power supply due to transient power requirements. The DHES also allows for a faster response than a typical generator, when supplying the additional power to the power system. Additionally, a smaller and/or lighter generator allows for an extended life of operation, which increases reliability of the system, and reduces maintenance and replacement costs. Reduced weight and size correlate to competitive advantages during flight.

Additionally, another advantage of the above described embodiments allows for less degradation in charging and discharging performance of the battery due to the priority discharging of the ultra-capacitor during transient power requirements. Less degradation of battery performance from the charging and discharging stresses of use increases the reliability and longevity of the battery system of the aircraft and reduces maintenance and replacement costs.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the innovation, including the best mode, and also to enable any person skilled in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling the supply of power to a power system for an aircraft having a plurality of power-consuming components, some of which have transient power requirements, resulting in the power system having a transient-state power requirement and a non-transient power requirement, the method comprising:
   supplying power to the power system with a generator having a predetermined power output incapable of providing sufficient power for the transient-state power requirement;
   determining a transient power requirement of the power system;
   comparing the determined transient power requirement to a predetermined power output;
   determining the transient power requirement exceeds the predetermined power output;
   supplying additional power to the power system from a non-battery power source in response to the determination that the transient power requirement exceeds the predetermined power output; and
   supplying additional power to the power system from a battery power source in response to the determination that the transient power requirement exceeds a combination of the predetermined power output and the additional power from the non-battery power source.

2. The method of claim 1 further comprising recharging at least one of the non-battery power source or battery power source during the non-transient power requirement.

3. The method of claim 2 wherein the recharging further comprises prioritizing the recharging of the non-battery power source over the recharging of the battery power source.

4. The method of claim 2 wherein the recharging of the non-battery power source and battery power source occur simultaneously.

5. A method of controlling the supply of power to a power system for an aircraft having a plurality of power-consuming components, some of which have transient power requirements, resulting in the power system having a transient-state power requirement and a non-transient power requirement, the method comprising:
   supplying power to the power system with a generator having a predetermined power output incapable of providing sufficient power for the transient-state power requirement, the predetermined power requirement comprises an average power requirement of the power system;
   removing the average power requirements of the energy consuming components leaving only the transient-state power requirement of the energy consuming components;
   sending signals to at least two controllers, said controllers being in bi-directional communication to enable cooperative controlling of at least one first power source and at least one second power source for supplying additional power to meet the transient-state power requirement; and
   supplying the additional power to the power system from at least one of the at least one first power source and the at least one second power source in response to a need for transient power.

6. The method of claim 5, wherein the at least one first power source is a non-battery power source and the at least one second power source is a battery power source.

7. The method of claim 6, wherein the supplying step comprises supplying power from both the non-battery and battery power sources.

8. A method of controlling the supply of power to a power system for an aircraft having a plurality of power-consuming components, some of which have transient power requirements, resulting in the power system having a transient-state power requirement and a non-transient power requirement, the method comprising:
   supplying power to the power system with a generator having a predetermined power output incapable of providing sufficient power for the transient-state power requirement;
   determining a transient power requirement of the power system;
   comparing the determined transient power requirement to the predetermined power output;
   determining the transient power requirement exceeds the predetermined power output; and
   supplying additional power to the power system from a non-battery power source in response to the determination that the transient power requirement exceeds the predetermined power output;
   wherein the predetermined power output comprises an average power requirement of the power system.

9. The method of claim 8 further comprising recharging at least one of the non-battery power source or a battery power source during the non-transient power requirement.

10. The method of claim 8 wherein supplying additional power from the non-battery power source comprises discharging at least one of a capacitor, an ultra-capacitor, or a capacitor bank.

11. The method of claim 8 wherein the supplying additional power further comprises converting the additional power from the non-battery power source to match power characteristics of the power system.

* * * * *